United States Patent
Kang et al.

[11] Patent Number: 5,781,861
[45] Date of Patent: Jul. 14, 1998

[54] METHOD FOR SHEDDING TRAFFIC LOAD IN CODE DIVISION MULTIPLE ACCESS MOBILE COMMUNICATION SYSTEM

[75] Inventors: Chang-Soon Kang, Seo-ku; Seon-Ho Hwang, Yusong-ku; Young-Nam Han, Yusong-ku; Myoung-Jin Kim, Yusong-ku; Hun Lee, Yuson-ku, all of Rep. of Korea

[73] Assignee: Electronics and Telecommunications Research Institute, Daejeon, Rep. of Korea

[21] Appl. No.: 709,842

[22] Filed: Sep. 10, 1996

[30] Foreign Application Priority Data

Dec. 6, 1995 [KR] Rep. of Korea ............... 1995 47061

[51] Int. Cl.$^6$ ................................................. H04B 7/26
[52] U.S. Cl. ................................................ 455/442; 370/332
[58] Field of Search .......................... 455/422, 436, 455/437, 439, 438, 442, 69; 370/335, 331, 332, 333; 375/200

[56] References Cited

U.S. PATENT DOCUMENTS 5,101,501  3/1992  Gilhousen et al. .
5,203,010  4/1993  Felix et al. .......................... 455/438
5,548,808  8/1996  Bruckert et al. ..................... 455/442
5,548,812  8/1996  Padovani et al. .................... 455/442

*Primary Examiner*—Amelia Au
*Attorney, Agent, or Firm*—Nixon & Vanderhye P.C.

[57] ABSTRACT

A method for shedding traffic load in a code division multiple access mobile communication system, the method performing a soft handoff operation using the ratio of the received forward link pilot signal power to the sum of all interference signals power to transfer a portion of traffic load in the present serving cell with a high traffic density to an adjacent cell with a low traffic density. When the amount of traffic load in the present serving cell is increased and thus exceeds a link capacity of the present serving cell, handoff parameters of all mobile stations in the present serving cell can be updated on the basis of a power allocation state managed by a base station without reducing the coverage of a forward link. On the basis of the updated handoff parameters, the soft handoff operation is performed from a part of the mobile stations in the present serving cell with the high traffic density (for example, mobile stations at the edge of the present serving cell) to the adjacent cell with the low traffic density. Therefore, the excessive traffic load amount in the present serving cell can effectively be shed.

6 Claims, 3 Drawing Sheets

△ MOBILE STATION
● BASE STATION

METHOD FOR SHEDDING TRAFFIC LOAD IN CODE DIVISION MULTIPLE ACCESS MOBILE COMMUNICATION SYSTEM

BACKGROUND OF THE INVENTION

1. Field of the Invention

The present invention relates in general to shedding traffic load in a code division multiple access (referred to hereinafter as CDMA) mobile communication system, and more particularly to a method for shedding traffic load in a CDMA mobile communication system, which is capable of, when the amount of traffic load in a specified cell is excessively increased by mobile subscribers and the amount of traffic load in an adjacent cell is small, performing a soft handoff operation from the specified cell to the adjacent cell to transfer a portion of the excessive traffic load in the specified cell to the adjacent cell, so that the excessive traffic load in the specified cell can effectively be shed.

2. Description of the Prior Art

Generally, in a CDMA mobile communication system, there are provided forward CDMA channels such as a pilot channel, control channels and traffic channels. The pilot channel is used to determine the coverage of a forward link (base station→mobile station) and to allow the mobile station to demodulate information received from the base station. The control channels are used to allow the base station to transfer information necessary to the call setup with the mobile station. The traffic channel is used for the transfer of data such as voice information between the base station and mobile station.

The base station allocates desired powers to the forward CDMA channels so that the radio channels can reach the corresponding receivers at their proper signal levels. At this time, the powers to the pilot and control channels are maintained constant. But, the power to the traffic channel is adjusted due to channel environmental variations resulting from the movement of the communicating mobile station and multipath propagation, etc.

As a result, the base station allocates the power only to the control channel when no traffic load is present in a cell managed thereby. In this case, the base station allocates the minimum power Min_power as will be mentioned later with reference to FIG. 3. As the amount of traffic load is increased in the cell, the base station increases the power to the traffic channels necessary to the communication with a plurality of mobile stations.

On the other hand, in the CDMA mobile communication system, the base station allocates a forward traffic channel and the associated power to the new arrived mobile call.

Referring to FIG. 2, a communicating mobile station in the present serving cell may receive a pilot signal from an adjacent cell as it moves to the adjacent cell. At this time, the communicating mobile station measures Ec/It, the ratio of the received pilot signal power to the sum of all interference signals power and compares the Ec/It with a handoff start threshold value T_ADD. If the measured Ec/It exceeds the handoff start threshold value T_ADD, the mobile station transmits a specified message to the serving cell to inform it of an identifier of the adjacent cell and the measured Ec/It. As a result, a soft handoff operation is started. The "soft handoff" signifies the switching of a traffic(communication) channel between cells with the same frequency. On the other hand, "softer handoff" signifies the swiching of a communication channel between sectors with the same frequency in the same cell.

On the other hand, when the Ec/It in the serving cell falls below a handoff complete threshold value T_DROP, the mobile station informs the present serving cell of such a situation in the same manner as mentioned above. As a result, the soft handoff operation is completed.

Referring to FIG. 1, when the traffic load in a specified one CELL A 1a among a plurality of cells in a mobile communication network is increased and thus exceeds a link capacity of the specified cell CELL A 1a, namely, when allocatable resources (traffic code channels, traffic channel power and etc.) are not enough in the specified cell CELL A 1a, the specified cell CELL A 1a blocks a new subscriber call or drops a handed-over call from the adjacent cell. As a result, the entire system performance is degraded.

Further, in the case where mobile stations at the edge of the specified cell CELL A 1a with the high traffic density receive a pilot signal from an adjacent cell CELL B 1b or CELL C 1c with a low traffic density and the Ec/It received from the adjacent cell CELL B 1b or cell C 1c is below the handoff start threshold value T_ADD, the soft handoff operation cannot be performed from the mobile stations to the adjacent cell CELL B 1b or CELL C 1c.

SUMMARY OF THE INVENTION

Therefore, the present invention has been made in view of the above problems, and it is an object of the present invention to provide a method for shedding traffic load in a CDMA mobile communication system, which is capable of, when the amount of traffic load in a specified cell is increased and thus exceeds a link capacity of the specified cell, performing a soft handoff operation from a part of communicating mobile stations in the specified cell to an adjacent cell with a low traffic density on the basis of a power allocation state managed by a base station without reducing the coverage of a forward link, so that the excessive traffic load amount in the specified cell can effectively be shed.

In accordance with the present invention, the above and other objects can be accomplished by a provision of a method for shedding traffic load in a code division multiple access mobile communication system, the method performing a soft handoff operation using the ratio of power of a forward link pilot signal to the sum of powers of all interference signals to transfer a portion of traffic load in the present serving cell with a high traffic density to an adjacent cell with a low traffic density, comprising the first step of checking the total amount of power allocated to forward CDMA channels and requesting all mobile stations in the present serving cell to update first and second handoff parameters, if the total amount of allocated power exceeds a threshold value of power which can be allocated to the mobile stations in the present serving cell; the second step of updating the first handoff parameters of the mobile stations by decreasing them by a first predetermined value received from a network and the second handoff parameters of the mobile stations by increasing them by a second predetermined value received from the network and starting the soft handoff operation from a part of the mobile stations in the present serving cell to the adjacent cell if the ratio of power of a pilot signal received from the adjacent cell to the sum of powers of all interference signals is higher than the updated first handoff parameter; and the third step of the soft handoff completion from the part of the mobile stations in the present serving cell to the adjacent cell if the ratio of power of a pilot signal received from the present serving cell to the sum of powers of all interference signals is lower than the updated second handoff parameter; whereby the amount of traffic load in the present serving cell with the high traffic density can effectively be shed to the adjacent cell with the low traffic density.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
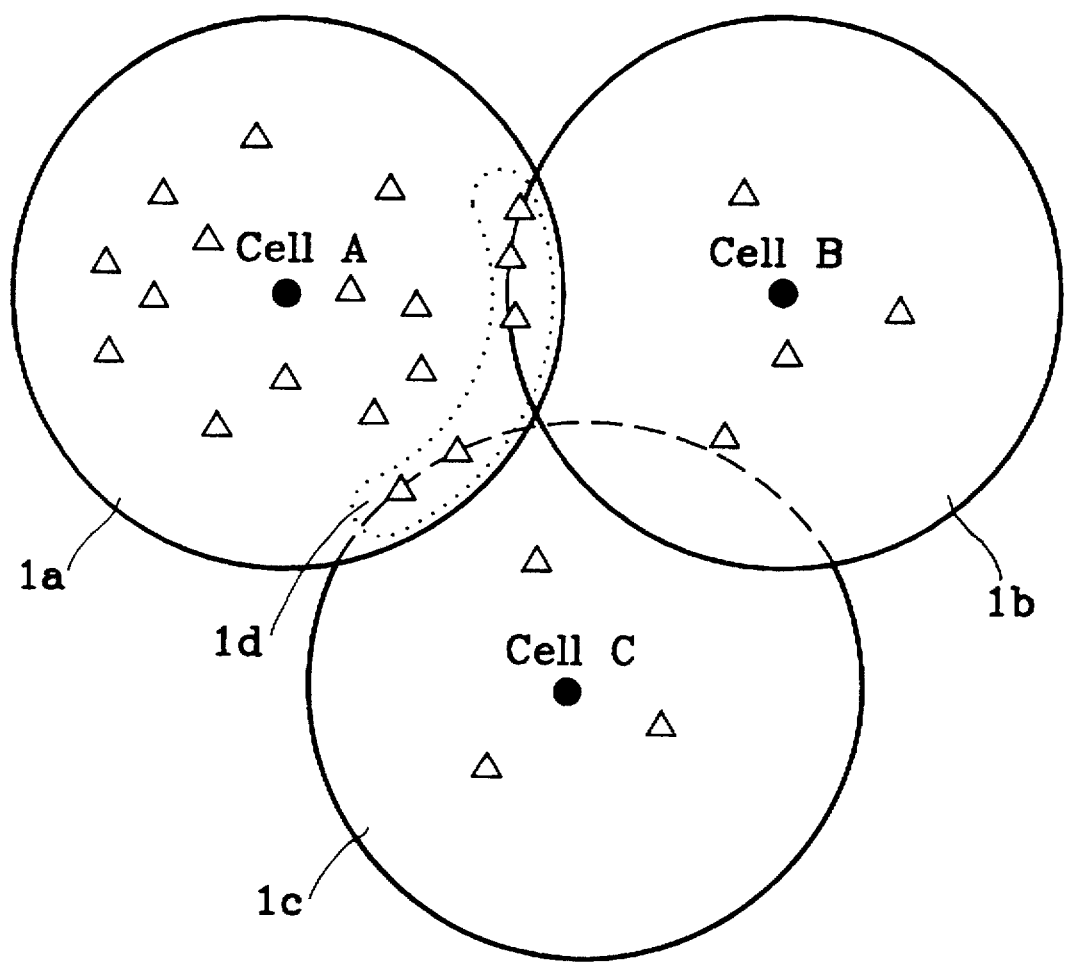
FIG. 1 is a view illustrating the traffic distribution by cells and the traffic load shedding.

FIG. 1 is a view illustrating the traffic distribution by cells and the traffic load shedding. In this drawing, a cell CELL A 1a has a relatively high traffic density, whereas adjacent cells CELL B 1b and CELL C 1c have a relatively low traffic density.

Figure 2:
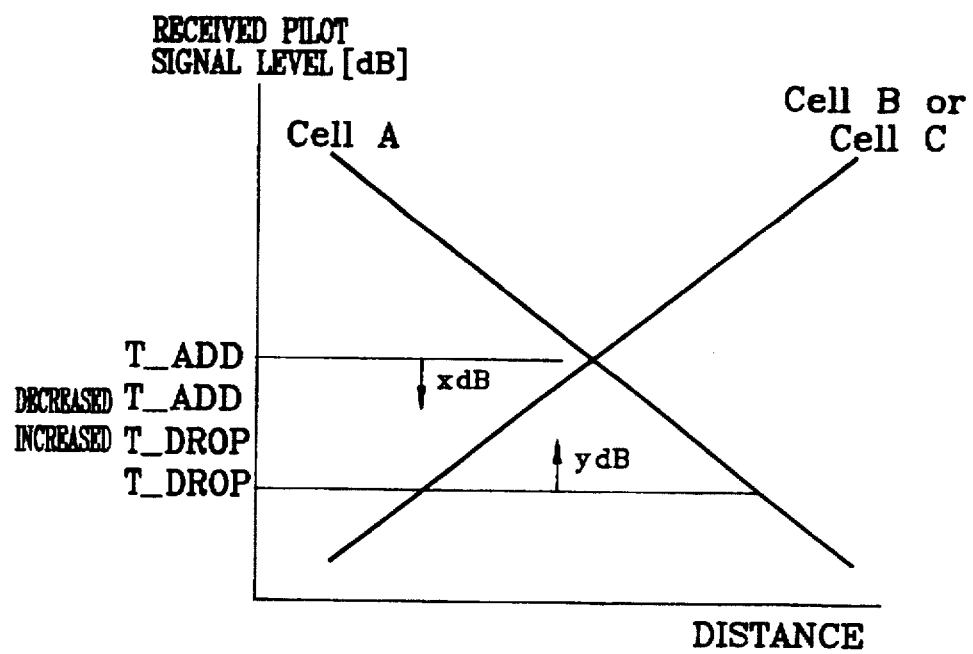
FIG. 2 is a view illustrating the relation between a distance and a received pilot signal level for the handoff request by a mobile station.

FIG. 2 is a view illustrating the relation between a distance and a received pilot signal level for the handoff determination (request) by a mobile station. In this drawing, "T_ADD" designates a handoff start threshold value which is received from a network and set by a mobile station, "Decreased T_ADD" designates a handoff start threshold value obtained by decreasing the handoff start threshold value T_ADD by a predetermined value received from the network, "T_DROP" designates a handoff complete threshold value which is received from the network and set by the mobile station and "Increased T_DROP" designates a handoff complete threshold value obtained by increasing the handoff complete threshold value T_DROP by a predetermined value received from the network.

Figure 3:
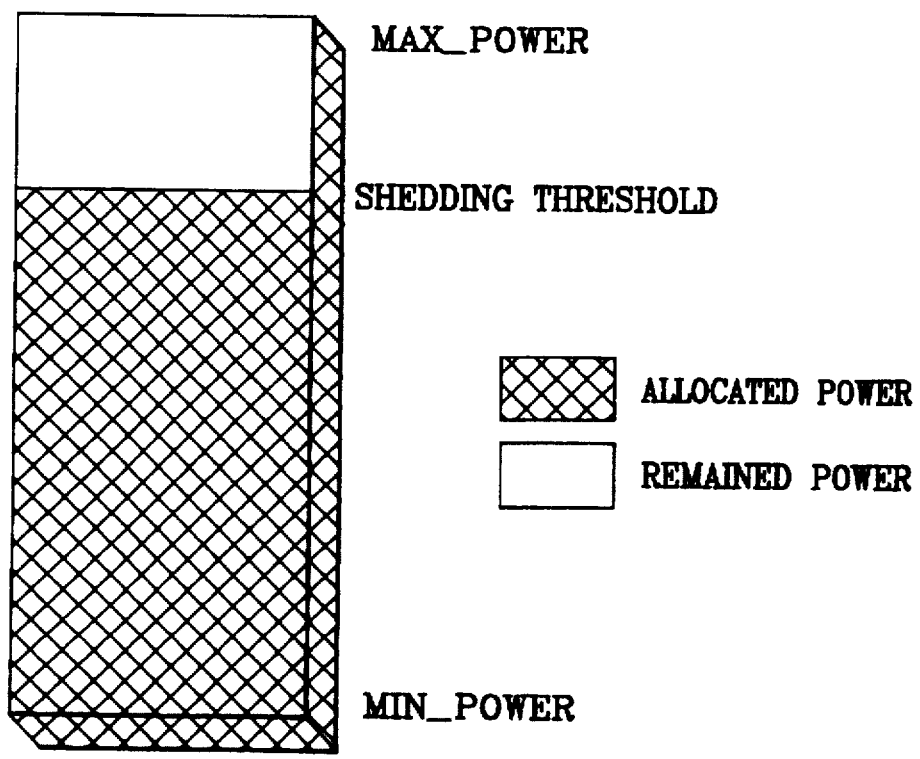
FIG. 3 is a view illustrating a forward link power allocation state and a threshold value of power which one base station can allocate to mobile stations managed thereby.

FIG. 3 is a view illustrating a forward link power allocation state and a threshold value Shedding_Threshold of power which one base station can allocate to mobile stations managed thereby. In this drawing, "Min_power" designates the minimum value of power which the base station allocates to forward CDMA channels and "Max_Power" designates the maximum value of power which the base station allocates to the forward CDMA channels.

Now, a method for shedding traffic load in a CDMA mobile communication system in accordance with the present invention will hereinafter be described in detail with reference to FIGS. 1 to 4.

Figure 4:
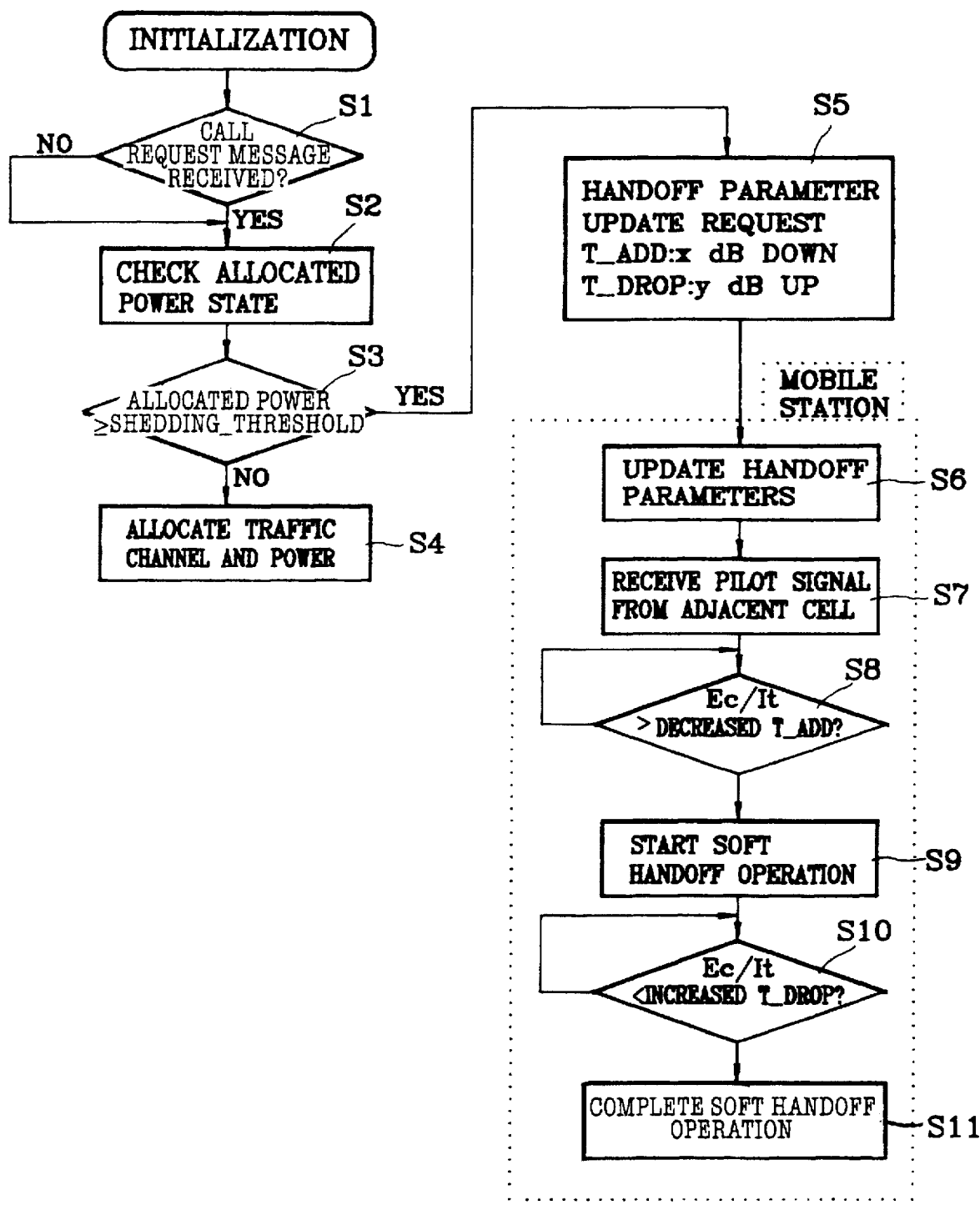
FIG. 4 is a flowchart illustrating a method for shedding traffic load in a CDMA mobile communication system in accordance with the present invention.

FIG. 4 is a flowchart illustrating the method for shedding traffic load in the CDMA mobile communication system in accordance with the present invention. First, the base station checks at the first step S1 whether a call request message from a new mobile station in the CDMA mobile communication system has been received. If it is checked at the first step S1 that the call request message from the new mobile station in the CDMA mobile communication system has been received, the base station checks the total amount of power previously allocated to the present traffic channels, at the second step S2. Then, the base station checks at the third step S3 whether the total amount of allocated power checked at the second step S2 has reached the allocatable power threshold value Shedding_Threshold.

If it is checked at the third step S3 that the total amount of allocated power checked at the second step S2 has not reached the allocatable power threshold value Shedding_Threshold, the base station allocates a new traffic channel and power to the new mobile station at the fourth step S4. To the contrary, in the case where it is checked at the third step S3 that the total amount of allocatable power checked at the second step S2 has reached the allocated power threshold value Shedding_Threshold, the base station requests all mobile stations in the present serving cell (for example, CELL A 1a) to update their previously set handoff parameters (handoff start threshold value T_ADD and handoff complete threshold value T_DROP), at the fifth step S5. Namely, when power cannot be allocated according to a new call request or a handoff call request in the present serving cell, the base station requests all mobile stations in the present serving cell to update their previously set handoff parameters.

At the sixth step S6, each mobile station updates its previously set handoff parameters in response to the handoff parameter update request from the base station in the present serving cell (for example, CELL A 1a).

At the seventh step S7, each mobile station in the cell CELL A 1a receives a pilot signal from the adjacent cell (for example, CELL B 1b or CELL C 1c).

At the eighth step S8, each mobile station in the cell CELL A 1a measures the ratio of the received pilot signal power to the sum of all interference signals power(Ec/It) and compares the measured Ec/It with the handoff start threshold value Decreased T_ADD obtained by decreasing the handoff start threshold value T_ADD by the predetermined value received from the network.

At the ninth step S9, in the case where the measured Ec/It is higher than the handoff start threshold value Decreased T_ADD at the eighth step S8, the soft handoff operation is started from a part of the mobile stations in the cell CELL A 1a with the high traffic density (for example, mobile stations at the edge of the cell CELL A 1a, designated by the reference numeral 1d in FIG. 1) to the adjacent cell CELL B 1b or CELL C 1c with the low traffic density.

At the tenth step S10, each mobile station 1d at the edge of the cell CELL A 1a measures the Ec/It of the pilot signal received from the cell CELL A 1a to the sum of all interference signals power and checks whether the measured Ec/It is lower than the handoff complete threshold value Increased T_DROP obtained by increasing the handoff end threshold value T_DROP by the predetermined value received from the network. If it is checked at the tenth step S10 that the measured Ec/It is lower than the handoff complete threshold value Increased T_DROP, the soft handoff operation is completed at the eleventh step S11 from the mobile stations id at the edge of the cell CELL A 1a to the adjacent cell CELL B 1b or CELL C 1c.

The method for shedding traffic load in the CDMA mobile communication system in accordance with the present invention will hereinafter be described in more detail.

First, the base station checks at the first step S1 whether a call request message from a new mobile station in the CDMA mobile communication system has been received. Among the radio associated resources managed by the base station, power to be allocated to the forward CDMA channels is limited, whereas the traffic channels are sufficient. In other words, the power is limited because the excessive power allocation may cause a hardware (RF device) of the base station to be in saturation and generate interference signals to mobile stations in the adjacent cells CELL B 1b and CELL C 1c.

For this reason, at the second step S2, a resource manager (not shown) in the base station checks the total amount of power previously allocated to the present traffic channels, when the traffic channel power is allocated for a new call request or a handoff call request, or at an interval of predetermined time. Here, the total amount of power checked by the base station resource manager is the sum of powers which the base station allocates to traffic channels and other forward DCMA channels.

Then, the base station checks at the third step S3 whether the total amount of allocated power checked at the second step S2 is greater than or equal to the allocatable power threshold value Shedding_Threshold. If it is checked at the third step S3 that the total amount of allocated power checked at the second step S2 is not greater than or equal to the allocatable power threshold value Shedding_Threshold, the base station allocates a new traffic channel and the associated power to the new mobile station at the fourth step S4.

However, in the case where it is checked at the third step S3 that the total amount of allocated power checked at the second step S2 is greater than or equal to the allocatable power threshold value Shedding_Threshold, namely, when the base station cannot allocate power according to a new call request or a handoff call request in the cell CELL A 1a with the increased traffic density, the base station requests all mobile stations in the cell CELL A 1a to update their previously set handoff parameters in the following manner, at the fifth step S5.

Namely, the base station instructs each mobile station to decrease the handoff start threshold value T_ADD by a predetermined value (x dB:FIG. 3) received from a network as shown in FIG. 2 to produce the handoff start threshold value Decreased T_ADD and to increase the handoff complete threshold value T_DROP by a predetermined value (y dB: FIG. 3) received from the network as shown in FIG. 2 to produce the handoff complete threshold value Decreased T_DROP.

As a result, at the sixth step S6, all the mobile stations in the cell CELL A 1a with the traffic density higher than that of the adjacent cells CELL B 1b and CELL C 1c update their previously set handoff parameters according to the values received from the network.

On the other hand, among the handoff parameters, the handoff start threshold value T_ADD is compared with the ratio Ec/It of the received forward link pilot signal power from the adjacent cell CELL B 1b or CELL C 1c to the sum of all interference signals power. In the case where the ratio Ec/It of the received pilot signal power at the seventh step S7 to the sum of all interference signals power is lower than the handoff start threshold value T_ADD, the corresponding mobile station cannot request the base station to perform the soft handoff operation.

For this reason, the handoff start threshold value Decreased T_ADD obtained by decreasing the handoff start threshold value T_ADD by the predetermined value received from the network is used as a new handoff start threshold value to be compared with the ratio Ec/It of the received pilot signal power to the sum of all interference signals power at the eighth step S8. As a result, at the ninth step S9, the soft handoff operation is more rapidly started from the mobile stations 1d at the edge of the cell CELL A 1a to the adjacent cell CELL B 1b or CELL C 1c without increasing the pilot channel power in the adjacent cell CELL B 1b or CELL C 1c.

Similarly, in order to complete the soft handoff operation, namely, to perform the complete switching to the communication channel of the adjacent cell CELL B 1b or CELL C 1c, the ratio Ec/It of the forward link pilot signal received from the busy cell CELL A 1a to the sum of all interference signals power must be lower than the handoff complete threshold value T_DROP in the mobile station.

For this reason, the handoff complete threshold value Increased T_DROP obtained by increasing the handoff complete threshold value T_DROP by the predetermined value received from the network is used as a new handoff complete threshold value to compared with the ratio Ec/It of power of the received pilot signal power to the sum of powers of all interference signals power at the tenth step S10. As a result, at the eleventh step S11, the soft handoff operation is more rapidly completed from the mobile stations 1d at the edge of the cell CELL A 1a to the adjacent cell CELL B 1b or CELL C 1c without increasing the forward link pilot channel power in the cell CELL A 1a.

Noticeably, in the case where the handoff start threshold value T_ADD and the handoff complete threshold value T_DROP are the same, they are adjusted in such a manner that the soft handoff operation can be rapidly started and completed at a lower signal level.

As apparent from the above description, according to the present invention, when the amount of traffic load in a specified cell is increased and thus exceeds a link capacity of the specified cell, handoff parameters of all mobile stations in the specified cell can be updated on the basis of a power allocation state managed by a base station without reducing the coverage of a forward link. On the basis of the updated handoff parameters, the soft handoff operation is performed from a part of the mobile stations in the specified cell with the high traffic density (for example, mobile stations at the edge of the specified cell) to an adjacent cell with the low traffic density. Therefore, the excessive traffic load amount in the specified cell can effectively be shed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for shedding traffic load in a code division multiple access mobile communication system, said method performing a soft handoff operation using the ratio of a forward link pilot signal power to the sum of all interference signals power to transfer a portion of traffic load in the present serving cell with a high traffic density to an adjacent cell with a low traffic density, comprising the steps of:

(a) checking the total amount of power allocated to forward code division multiple access channels and requesting all mobile stations in the present serving cell to update first and second handoff parameters, if the total amount of allocated power exceeds a threshold value of power which can be allocated to said mobile stations in the present serving cell;

(b) updating the first handoff parameters of said mobile stations by decreasing them by a first predetermined value received from a network and the second handoff parameters of said mobile stations by increasing them by a second predetermined value received from said network and starting the soft handoff operation from a part of said mobile stations in the present serving cell to the adjacent cell if the a pilot signal power received from the adjacent cell to the sum of powers of all interference signals power is higher than said updated first handoff parameter; and (c) completing the soft handoff operation from said part of said mobile stations in the present serving cell to the adjacent cell if the ratio of the a pilot signal power received from the present serving cell to the sum of all interference signals power is lower than said updated second handoff parameter;

whereby the amount of traffic load in the present serving cell with the high traffic density can effectively be shed to the adjacent cell with the low traffic density.

2. A method for shedding traffic load in a code division multiple access mobile communication system, as set forth in claim 1, wherein said step (a) includes the steps of:

(a-1) checking whether a call request message from a new mobile station in the code division multiple access mobile communication system has been received;

(a-2) checking the total amount of power previously allocated to the present traffic channels, if it is checked at said step (a-1) that the call request message from the new mobile station in the code division multiple access mobile communication system has been received;

(a-3) checking whether the total amount of allocated power checked at said step (a-2) has reached the threshold value of power which can be allocated to said mobile stations in the present serving cell;

(a-4) allocating a new traffic channel and power to the new mobile station if it is checked at said step (a-3) that the total amount of allocated power checked at the said step (a-2) has not reached the allocatable power threshold value; and (a-5) requesting said mobile stations in the present serving cell to update the first and second handoff parameters, if it is checked at said step (a-3) that the total amount of allocated power checked at the said step (a-2) has reached the allocatable power threshold value.

3. A method for shedding traffic load in a code division multiple access mobile communication system, as set forth in claim 2, wherein said step (a-2) includes the step of checking the total amount of power previously allocated to the present traffic channels, when the traffic channel power is allocated for a new call request or a handoff call request, or at an interval of predetermined time.

4. A method for shedding traffic load in a code division multiple access mobile communication system, as set forth in claim 2, wherein said step (a-5) includes the step of requesting said mobile stations in the present serving cell to update the first and second handoff parameters, when power cannot be allocated according to a new call request or a handoff call request in the present serving cell.

5. A method for shedding traffic load in a code division multiple access mobile communication system, as set forth in claim 1, wherein said step (b) includes the steps of:

(b-1) updating the first handoff parameters of said mobile stations by decreasing them by the first predetermined value received from said network and the second handoff parameters of said mobile stations by increasing them by the second predetermined value received from said network;

(b-2) receiving the pilot signal from the adjacent cell;

(b-3) detecting the ratio of power of the pilot signal received at said step (b-2) to the sum of powers of all interference signals;

(b-4) checking whether the ratio detected at said step (b-3) is higher than said updated first handoff parameter; and (b-5) starting the soft handoff operation from said part of said mobile stations in the present serving cell to the adjacent cell if it is checked at said step (b-4) that the ratio detected at said step (b-3) is higher than said updated first handoff parameter.

6. A method for shedding traffic load in a code division multiple access mobile communication system, as set forth in claim 1, wherein said step (c) includes the steps of:

(c-1) receiving the pilot signal from the present serving cell;

(c-2) detecting the ratio of power of the pilot signal received at said step (c-1) to the sum of powers of all interference signals;

(c-3) checking whether the ratio detected at said step (c-2) is lower than said updated second handoff parameter; and (c-4) completing the soft handoff operation from said part of said mobile stations in the present serving cell to the adjacent cell if it is checked at said step (c-3) that the ratio detected at said step (c-2) is lower than said updated second handoff parameter.

* * * * *